(12) United States Patent
Orchard (10) Patent No.: US 11,084,566 B2
(45) Date of Patent: Aug. 10, 2021

(54) PASSIVELY ACTUATED FLUID FOIL

(71) Applicant: AIRBUS SAS, Blagnac (FR)

(72) Inventor: Matthew Orchard, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 307 days.

(21) Appl. No.: 16/220,021

(22) Filed: Dec. 14, 2018

(65) Prior Publication Data
US 2019/0185137 A1    Jun. 20, 2019

(30) Foreign Application Priority Data
Dec. 18, 2017    (GB) ...................................... 1721107

(51) Int. Cl.
*B64C 3/42* (2006.01)
*B64C 23/06* (2006.01)
(Continued)

(52) U.S. Cl.
CPC ................ *B64C 3/42* (2013.01); *B63B 1/248* (2013.01); *B64C 23/072* (2017.05);
(Continued)

(58) Field of Classification Search
CPC ........... B64C 3/42; B64C 3/56; B64C 23/072; B64C 23/076; B63B 1/248; B63B 1/285; B63B 2001/281
See application file for complete search history.

(56) References Cited

U.S. PATENT DOCUMENTS 1,888,418 A * 11/1932 Adams .................. B64C 23/076
244/218
6,345,790 B1 * 2/2002 Brix ...................... B64C 23/076
244/199.4
(Continued)

FOREIGN PATENT DOCUMENTS

CN         105416568       3/2016
DE         103 13 290      10/2004
(Continued)

OTHER PUBLICATIONS

European Search Report cited in Ep 18211292.0 dated Apr. 9, 2019, 6 pages.
(Continued)

*Primary Examiner* — Rodney A Bonnette
(74) *Attorney, Agent, or Firm* — Nixon & Vanderhye P.C.

(57) ABSTRACT

A fluid foil has a main fixed portion and a tip portion movably mounted at a tip end of the main fixed portion. The main fixed portion has an upper surface and a lower surface, and the tip portion has an upper surface and a lower surface. The fluid foil is operable in: a) a first configuration in which the upper surface of the tip portion is angled downwardly with respect to the upper surface of the main fixed portion; and b) a second configuration in which the tip portion is rotated upwardly with respect to the first configuration such that the upper surface of the tip portion and the upper surface of the main fixed portion are substantially continuous surfaces. The movement of the tip portion with respect to the main fixed portion is exclusively passively actuated by movement of the foil with respect to a surrounding fluid.

13 Claims, 10 Drawing Sheets

(51) Int. Cl.
  *B63B 1/24* (2020.01)
  *B63B 1/28* (2006.01)
  *B64C 3/56* (2006.01)
(52) U.S. Cl.
  CPC ...... *B64C 23/076* (2017.05); *B63B 2001/281* (2013.01); *B64C 3/56* (2013.01)

(56) References Cited

U.S. PATENT DOCUMENTS

| | | | |
|---|---|---|---|
| 6,497,600 | B1 | 12/2002 | Levy et al. |
| 2003/0001045 | A1* | 1/2003 | Yifrach .................... B64C 3/56 |
| | | | 244/35 R |
| 2011/0042524 | A1 | 2/2011 | Hemmelgarn et al. |
| 2011/0272530 | A1 | 11/2011 | Mann |
| 2015/0308403 | A1 | 10/2015 | Enevoldsen et al. |
| 2016/0368594 | A1* | 12/2016 | Cazals ................. B64C 23/072 |
| 2017/0021911 | A1 | 1/2017 | Wildschek et al. |
| 2017/0113780 | A1* | 4/2017 | Boye ..................... B64C 23/072 |
| 2017/0190410 | A1* | 7/2017 | Good ........................ B64C 3/56 |
| 2017/0203830 | A1 | 7/2017 | Roman et al. |

FOREIGN PATENT DOCUMENTS

| | | |
|---|---|---|
| EP | 1 531 126 | 5/2005 |
| GB | 657488 | 9/1951 |
| WO | 2010/100048 | 9/2010 |
| WO | 2017/118832 | 7/2017 |
| WO | 2018/000042 | 1/2018 |

OTHER PUBLICATIONS

Search Report for GB1721107.9 dated Jun. 14, 2018, 8 pages.
S. Miller et al., "Development of an Adaptive Wing Tip Device", *Structures, Structural Dynamics, and Materials Conference*, May 4-7, 2009, 14 pages.

* cited by examiner

_PASSIVELY ACTUATED FLUID FOIL_

RELATED APPLICATION

This application claims priority to United Kingdom Patent Application GB 1721107.9 filed Dec. 18, 2017, the entirety of which is incorporated by reference.

FIELD OF THE INVENTION

The present invention relates to a fluid foil having a movable portion.

BACKGROUND OF THE INVENTION

The aerodynamic efficiency of aircraft is related to the effective wing span, which because of the deflection of a wing due to its inherent structural flexibility and the aerodynamic loading acting mean it will reduce in flight shape. Normally it is not possible to simply increase the fixed span of the wing to compensate, especially in commercial aviation, as there are fixed aircraft categories to match terminal gate and runway and taxiway widths, which either make it impossible geometrically to extend, or will attract higher airport charges affecting the economics and operability of the aircraft.

There have been various different attempts to overcome this constraint, each with limitations:

Folding Wing tips—system complexity and weight
Increased wing rigidity—trade structural weight for span
Downlets (downward pointing winglets)—benefit from the wing deflection but there are limits on the level of benefit possible due to geometries A weakness of many downlet devices is that whilst they benefit from the flexibility of the wing, they have a predominantly rigid connection to the wing, so they are a compromise between the aircraft category/gate limit and minimum ground clearance height limit and the geometric shape that it then deflects to for the cruise portion of the flight.

Mechanically folding the wing has the weakness of the weight, complexity and reliability of the fold mechanism, even if it does not have the disadvantage of the downlet that the attached winglet device can be positioned for the optimum position by the mechanical fold.

It should also be noted that an increase in wing span, from attracting aerodynamic loads at a greater distance from the wing root, will also result in new structural challenges, and a means to mitigate the loads sizing cases due to span is also beneficial in any solution to the problem of reduced span in the flight shape.

The problem of maintaining the effective span is not unique to aerofoils on commercial aircraft, and is also observed in aerofoils for all many fixed wing aircraft types, and also in hydrofoils for boats.

SUMMARY OF THE INVENTION

A first aspect of the invention provides a fluid foil having a main fixed portion and a tip portion movably mounted at a tip end of the main fixed portion, wherein the main fixed portion has an upper surface and a lower surface, and the tip portion has an upper surface and a lower surface, and the fluid foil is operable in:

a) a first configuration in which the upper surface of the tip portion is angled downwardly with respect to the upper surface of the main fixed portion; and b) a second configuration in which the tip portion is rotated upwardly with respect to the first configuration such that the upper surface of the tip portion and the upper surface of the main fixed portion are substantially continuous surfaces, wherein the movement of the tip portion with respect to the main fixed portion is exclusively passively actuated by movement of the foil with respect to a surrounding fluid.

A further aspect of the invention provides a method of operating a fluid foil having a main fixed portion and a tip portion movably mounted at a tip end of the main fixed portion, wherein the main fixed portion has an upper surface and a lower surface, and the tip portion has an upper surface and a lower surface, and method comprising placing the fluid foil in:

a) a first configuration in which the upper surface of the tip portion is angled downwardly with respect to the upper surface of the main fixed portion; and b) a second configuration in which the tip portion is rotated upwardly with respect to the first configuration such that the upper surface of the tip portion and the upper surface of the main fixed portion are substantially continuous surfaces, wherein the movement of the tip portion with respect to the main fixed portion is exclusively passively actuated by movement of the foil with respect to a surrounding fluid.

The invention is advantageous in that the downward orientation of the tip portion in the first configuration can provide a reduced span to meet aircraft category/gate limits. Rotation of the tip portion with respect to the main fixed portion to assume the second configuration means that the fluid foil can have an optimized shape with the most beneficial span in operation, e.g. cruise flight shape when embodied as an aircraft wing. This rotation is caused purely passively be movement of the fluid foil relative to the surrounding fluid. The rotation may be about a flexible or sprung element used to attach the tip portion to the main fixed portion, as opposed to a traditional rigid attachment or a complex actively actuated folding mechanism. The tip portion can be considered as a 'floating' wing portion.

The fluid foil may further be operable in:

c) a third configuration in which the upper surface of the tip portion is angled upwardly with respect to the upper surface of the main fixed portion.

The upward rotation to the third configuration may be used to provide a passive loads alleviation function.

The tip portion may be movably mounted to the main fixed portion by a hinge or a flexible element. Alternatively the entire tip portion may be constructed as a flexible element that droops (first configuration) under its own weight when the aerodynamic load is low (stationary or slow speed taxi) and which deflects upwardly (second configuration) when the aerodynamic load increases.

The fluid foil may have a span which increases between the first configuration and the second configuration.

The tip portion may be biased towards the first configuration. The tip portion may be biased towards the first configuration by a variable spring. The variable spring may be configured to impart a spring force which varies as the tip portion is rotated upwardly with respect to the first configuration.

The tip portion may be configured to rotate about a pitch axis as the tip portion is rotated upwardly with respect to the first configuration. Rotation about the pitch axis may be used to provide a beneficial change in incidence (alpha) of the tip portion as the tip portion rotates upwardly with respect to the first configuration. The rate of change of incidence of the tip portion may be non-linearly related to the angular rotation of the tip portion upwardly with respect to the first configuration. The change in incidence may be positive or negative or may undergo an inflection changing form positive to negative or vice versa as the tip portion rotates upwardly with respect to the first configuration. The hinge or other flexural element may be configured to enable concurrently a change in the aerofoil pitch of the tip portion as the tip portion deflects in a vertical plane.

The tip portion may be arranged to have an angle of incidence (positive alpha) which reduces as the tip portion is rotated upwardly with respect to the first configuration.

The first configuration may correspond to the downward-most position of the tip portion. A stop may be provided to prevent over rotation of the tip portion. The downward-most position of the tip portion may correspond to a minimum height ground clearance.

The tip portion may have a mass, and the weight of the tip portion may bias the tip portion towards the first configuration.

The tip portion may be configured to remain in its downward-most position during relative forward movement of the foil through a fluid which is below a predetermined forward speed. This predetermined speed may, for example, be a normal taxi speed for an aircraft application.

The tip portion may have a mass and a spring, and the weight of the tip portion together with the spring may bias the tip portion to remain in its downward-most position below the predetermined forward speed.

The tip portion may include a first lifting surface having the upper surface and the lower surface of the tip portion, and the tip portion further comprises one or more secondary lifting surfaces.

The secondary lifting surface may be fixed or rotatable with respect to the first lifting surface. The secondary lifting surface may be coupled to the first lifting surface or to the main fixed portion of the fluid foil. The secondary lifting surface may be coupled by a similar hinge or flexible element to that used to connect the tip portion to the main fixed portion.

The fluid foil may be an aerofoil, preferably a wing of a fixed wing aircraft, or a hydrofoil.

BRIEF DESCRIPTION OF THE DRAWINGS

Embodiments of the invention will now be described with reference to the accompanying drawings, in which:

FIG. 11 shows another example of a wing tip portion having first and second lifting surfaces, shown a) angled downwardly in a first configuration and b) rotated upwardly to a second configuration;

FIG. 12 shows yet another example of a wing tip portion having first and second lifting surfaces, shown a) angled downwardly in a first configuration and b) rotated upwardly to a second configuration;

FIG. 13 shows yet another example of a wing tip portion having first and second lifting surfaces, shown a) with the first lifting surface angled downwardly in a first configuration and b) rotated upwardly to a second configuration.

DETAILED DESCRIPTION OF EMBODIMENT(S)

Figure 1:
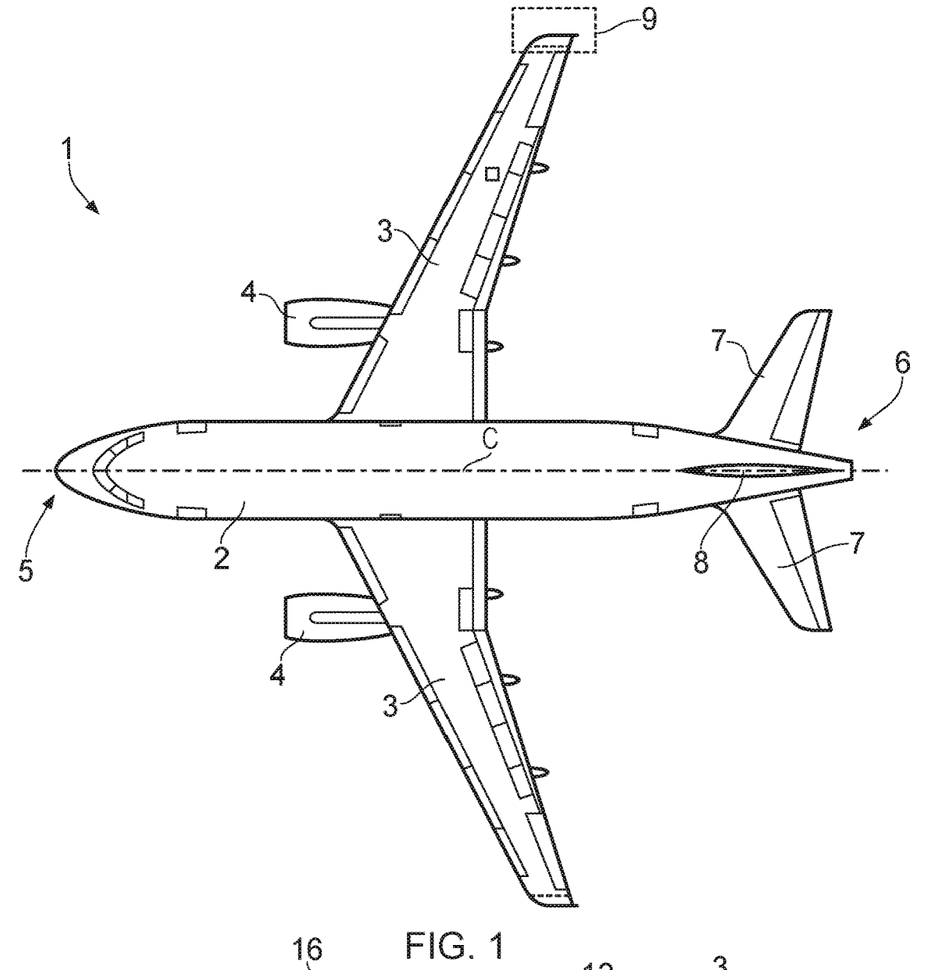
FIG. 1 shows a plan view of a fixed wing aircraft.

FIG. 1 shows a plan view of an aircraft 1 having a fuselage 2, wings 3, under wing mounted engines 4, a nose end 5 and a tail end 6, the tail end 6 including horizontal and vertical stabilising surfaces 7, 8. The aircraft 1 is a typical jet passenger transport aircraft but the invention is applicable to a wide variety of fixed wing aircraft types, including commercial, military, passenger, cargo, jet, propeller, general aviation, etc. with any number of engines attached to the wings or fuselage.

Each wing 3 has a root end adjacent to the fuselage 2 and a tip end opposite the root end. The tip end of the starboard wing 3 of aircraft 1 is generally indicated by the box 9 shown in broken lines. The port wing 3 of aircraft 1 is a near identical mirror image of the starboard wing.

Figure 2:
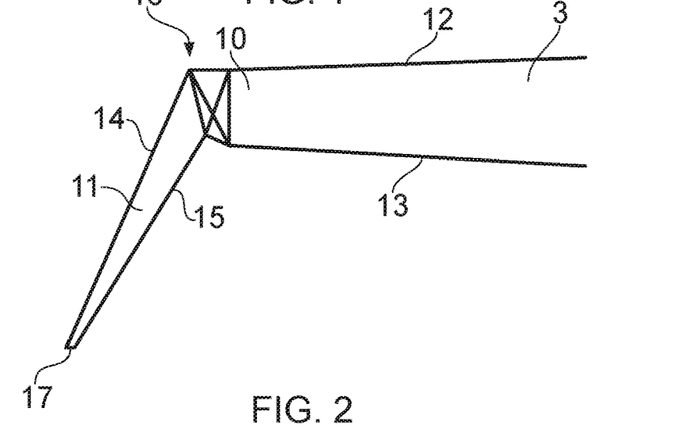
FIG. 2 shows a view looking aft of the wing tip region of the aircraft shown in FIG. 1, with a wing tip portion angled downwardly in a first configuration.

FIG. 2 shows in detail a view looking aft (i.e. from the nose end 5 along the aircraft centre line C) showing the starboard wing 3 having a tip end 10 and a tip portion 11 movably mounted at the tip end 10 of the main fixed portion of the wing 3. The main fixed portion has an upper surface 12 and a lower surface 13. The tip portion 11 has an upper surface 14 and a lower surface 15. The tip portion is movably mounted to the tip end 10 of the main fixed portion of the wing 3 by a hinge 16. The hinge enables rotation of the tip portion 11 with respect to the main fixed portion of the wing 3 in a vertical plane generally perpendicular to the centre line C of the aircraft 1. The axis of rotation may be considered to be generally chordwise, where the chord of the wing 3 is a line extending between the leading edge and trailing edge of the wing.

The hinge 16 is a sprung hinge which biases the tip portion 11 to a downwardly depending orientation, as shown in FIG. 2, in which the upper surface 14 of the tip portion 11 is angled substantially downwardly with respect to the upper surface 12 of the main fixed portion of the wing 3. The sprung hinge 16 may be considered similar to a "live hinge". The sprung hinge may be constructed with one or more flexible (semi-rigid) elements. A variety of different constructions for the sprung hinge 16 will be apparent to those skilled in the art.

Figure 3:
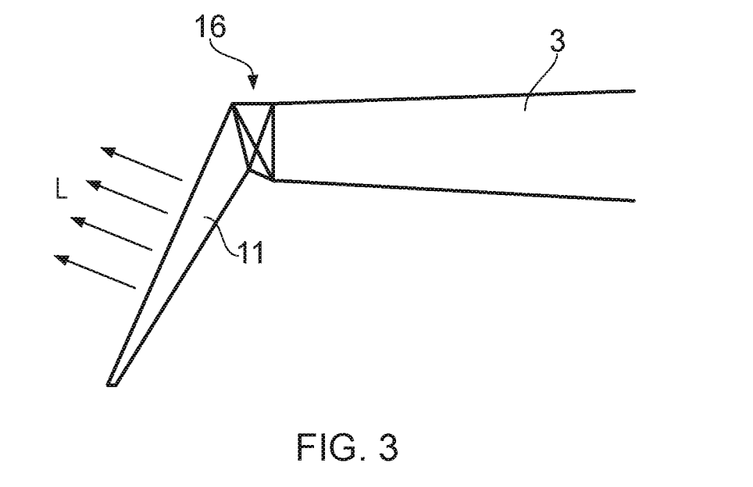
FIG. 3 shows a view similar to FIG. 2 with the aerodynamic forces acting on the wing tip portion shown, which are insufficient to raise the wing tip portion from the first configuration.

Operation of the movable tip portion 11 will now be described. In FIG. 3 the lifting force L acting on the tip portion 11 due to forward movement of the wing 3 with respect to the surrounding body of air is insufficient to overcome the biasing action of the sprung hinge 16 which, together with the mass of the tip portion 11, acts to urge the tip portion 11 to a downward-most position corresponding to a first configuration of the tip portion.

When the aircraft 1 is stationary or is taxing (typically at a speed below around knots) the first configuration of the tip portion 11 provides a reduced overall span of the wing 3 such that the aircraft 1 may comply with various span constraints. The length of tip portion and the downward angle of the tip portion 11 in this downward-most position are selected to ensure that the tip end 17 of the tip portion meets ground clearance limitations for the aircraft 1. Through a combination of the weight of the wing tip portion 11 and the biasing action of the sprung hinge 16, the tip portion 11 remains in the first configuration, with the appearance of a traditional downlet, when the aircraft 1 is stationary or taxing.

Figure 4:
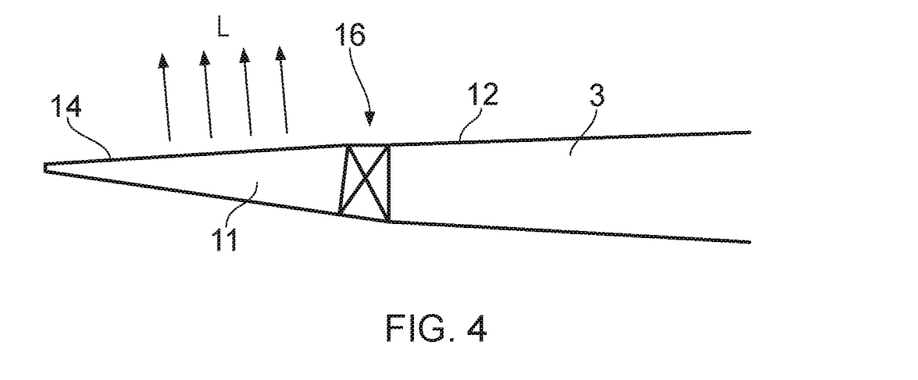
FIG. 4 shows a view similar to FIG. 3, in which the aerodynamic forces acting on the wing tip portion shown are sufficient to raise the wing tip portion to a second configuration.

FIG. 4 illustrates the wing tip portion 11 in a second configuration in which the tip portion 11 is rotated upwardly with respect to the first configuration shown in FIG. 3 such that the upper surface 14 of the tip portion 11 and the upper surface 12 of the main fixed portion of the wing 3 are substantially continuous surfaces without any significant angle formed between those surfaces. As the aircraft 1 exceeds a normal taxing speed and moves into the take-off roll the lift forces L on the tip portion 11 create a moment that will exceed the weight of the tip portion 11 and the spring load of the sprung hinge 16 and allow the tip portion 11 to rotate upwards. In this second configuration the span of the wing 3 increase to a maximum and this configuration is maintained for the majority of the climb, cruise, descent and general flight of the aircraft 1.

Figure 5:
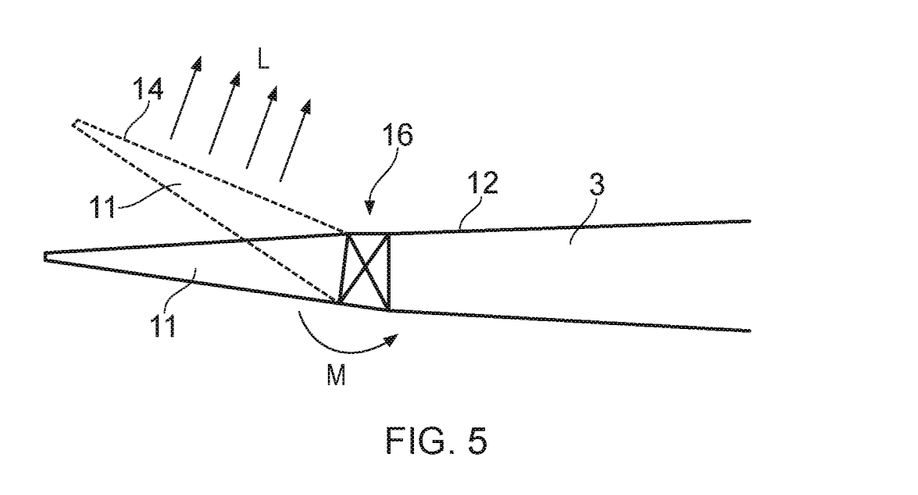
FIG. 5 shows a view similar to FIG. 4, in which the aerodynamic forces acting on the wing tip portion shown are sufficient to raise the wing tip portion from a second configuration (solid lines) a third configuration (broken lines)

Next, as shown in FIG. 5, a third configuration of the wing tip portion 11 is shown. If during flight phases there is a load on the tip portion 11 that exceeds a predetermined load level then passive load alleviation can also be inherently built-in by allowing the tip portion 11 to deflect past the cruise optimised second configuration. As shown in FIG. 5, the upper surface 14 of the tip portion is angled upwardly with respect to the upper surface 12 of the main fixed portion of the wing 3. This passive loads alleviation may be used to provide gust loads alleviation during flight. By enabling this third configuration the structural weight of both the tip portion 11 and the remainder of the wing 3 to which it is attached can be reduced due to a reduction in the maximum aerodynamic load limit of the wing 3 due to the passive loads alleviation. Furthermore, this loads alleviation can also be used to improve passenger ride quality when the aircraft 1 is a passenger aircraft. When the temporary gust load has subsided the spring bias of the sprung hinge 16 provides a restorative moment M to return the tip portion 11 to the second configuration shown in FIG. 4.

One way in which the sprung hinge 16 or other flexible element used to rotatably mount the tip portion 11 to the main fixed portion of the wing 3 may be constructed is by having a variable spring as part of the design of the sprung hinge 16 or flexible element. The variable spring may be configured to impart a spring force which varies as the tip portion is rotated upwardly with respect to the first configuration shown in FIG. 3. The predetermined load level at which the tip portion 11 deflects upwardly from the second configuration shown in FIG. 4 to the third configuration shown in FIG. 3 may be controlled by adjusting the variable spring force.

Whilst the sprung hinge 16 may be configured to provide a simple rotation in the vertical plane, the sprung hinge 16 is most advantageously constructed as an offset hinge (see FIG. 10) to allow the tip portion 11 to also rotate about a pitch axis as the tip portion is rotated upwardly in the vertical plane. Rotation about a pitch axis enables the incidence (angle of attack, alpha) of the tip portion 11 to vary as the tip portion 11 rotates upwardly. As an alternative to an offset hinge an unbalanced flexural element may be used. This optimised hinged geometry will now be discussed in detail with reference to FIGS. 6-9.

Figure 6:
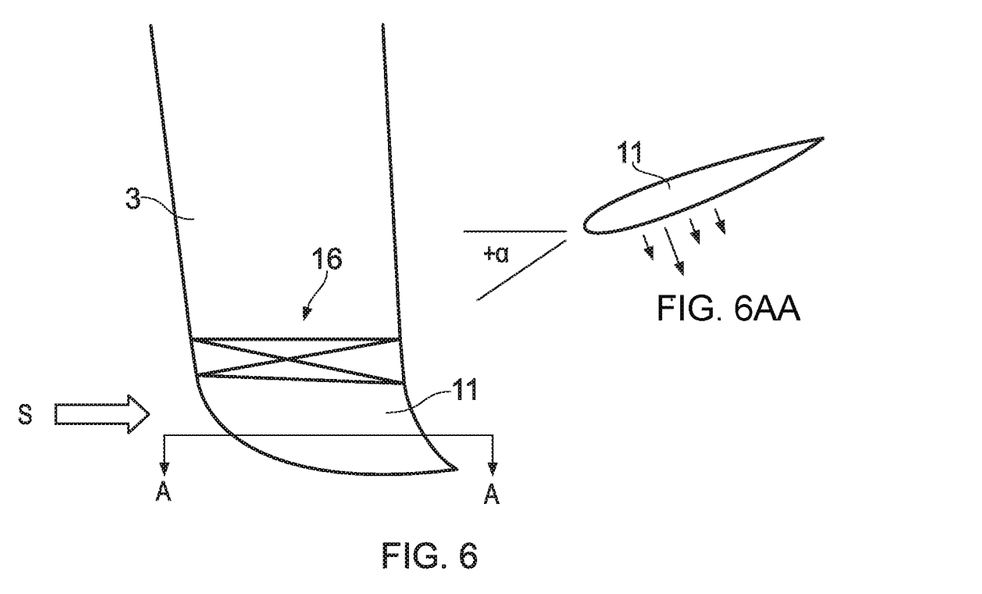
FIG. 6 shows a plan view of the wing tip portion in the first configuration of FIG. 3 together with FIG. 6AA which is a section view taken along line A-A in FIG. 6 and illustrating the incidence of the tip portion.

FIG. 6 shows a plan view from above of the outboard end of the wing 3 with the tip portion 11 in the first configuration. The direction of the oncoming freestream flow S (opposing the direction of flight) is indicated. FIG. 6AA is a the section view taken along line A-A in FIG. 6 and through the tip portion shows the incidence of the aerofoil section of the tip portion 11. As shown, in the first configuration the tip portion 11 has a significantly positive incidence, nose up, +ve alpha.

The spring load imparted by the sprung hinge 16 and the weight of the tip portion 11 should be considered for a normal taxi speed, so the low level of lift does not move the tip portion outside the aircraft category span constraints, even at this high positive incidence.

Figure 7:
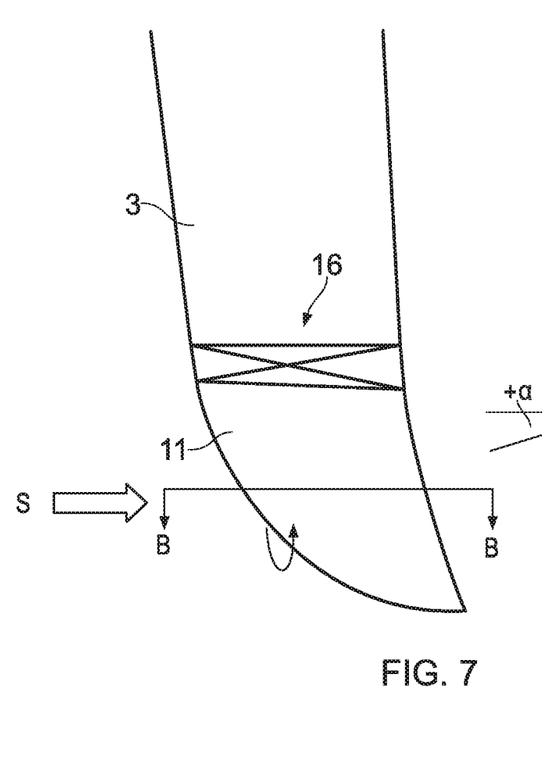
FIG. 7 shows a plan view of the wing tip portion between the first and second configurations together with FIG. 7BB which is a section view taken along line B-B in FIG. 7 and illustrating the incidence of the tip portion.

FIG. 7 shows the change in incidence as the tip portion 11 rotates upwardly between the first configuration and the second configuration. As shown in FIG. 7B-B the aerofoil section of the tip portion 11 is still at a nose up pitch but the angle of incidence, +ve alpha, is less than in FIG. 6A-A for the first configuration.

When the aircraft moves into the take-off roll, as the forward aircraft speed V exceeds that of normal taxing, the combination of velocity and alpha of the tip portion 11 should be such that the lift generated by the tip portion 11 exceeds the combined tip portion weight and spring load of the sprung hinge 16 and begins to rotate the tip portion 11 into the second configuration for flight. The variation and optimisation of the spring load of the hinge 16 and alpha of the tip portion 11 can take into account optimising the lift coefficient, Cl, of the wing 3 for the best runway field length.

Figure 8:
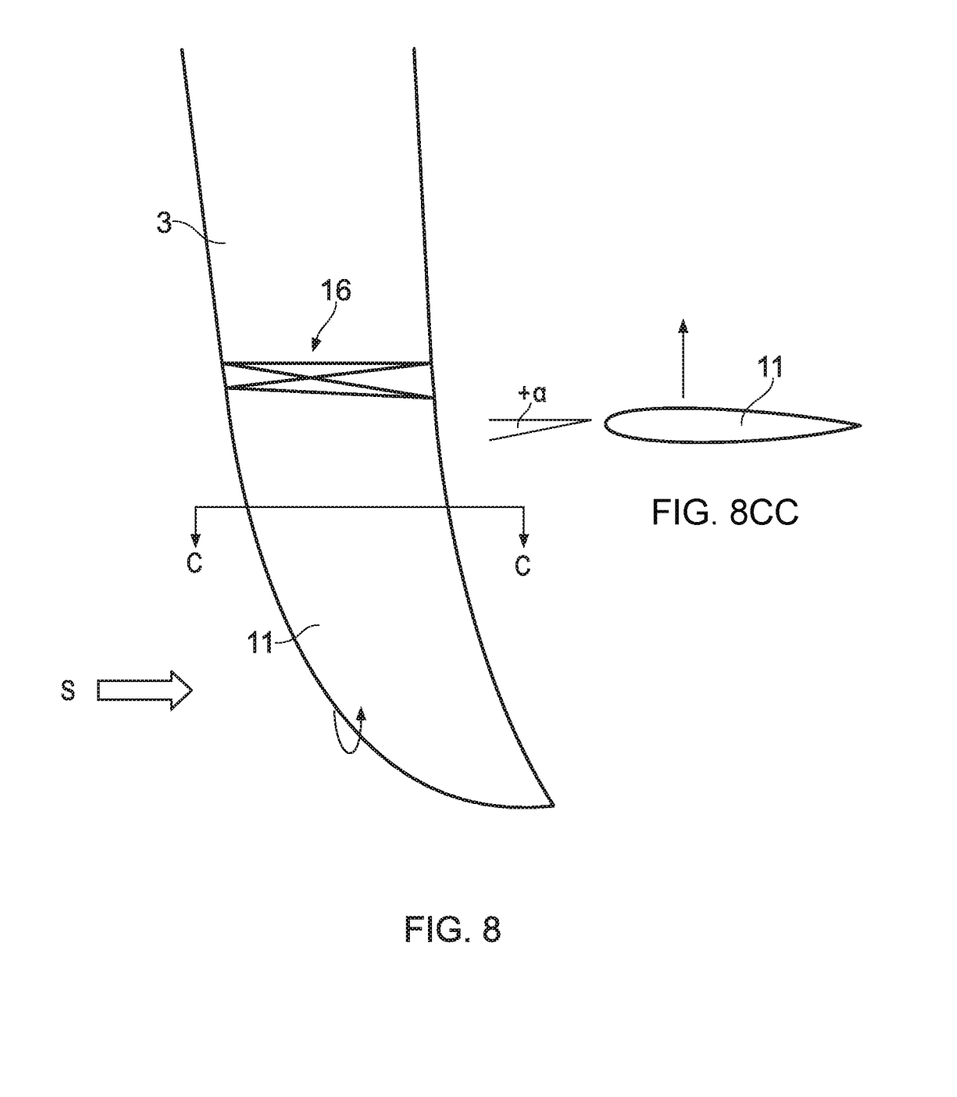
FIG. 8 shows a plan view of the wing tip portion in the second configuration of FIG. 4 together with FIG. 8CC which is a section view taken along line C-C in FIG. 8 and illustrating the incidence of the tip portion.

FIG. 8 shows the outboard end of the wing 3 in the second configuration in which the magnitude of the velocity of the freestream flow S is sufficiently great that the tip portion 11 adopts the second configuration.

In this second configuration used for the cruise phase of the aircraft flight the tip portion 11 can be torsionally deflected slightly nose upwards to have the optimum alpha/twist so both the tip portion 11 and the wing 3 as a whole have the best performance. As shown in FIG. 8C-C the tip portion 11 now adopts a slightly nose up pitch incidence, +ve alpha.

Figure 9:
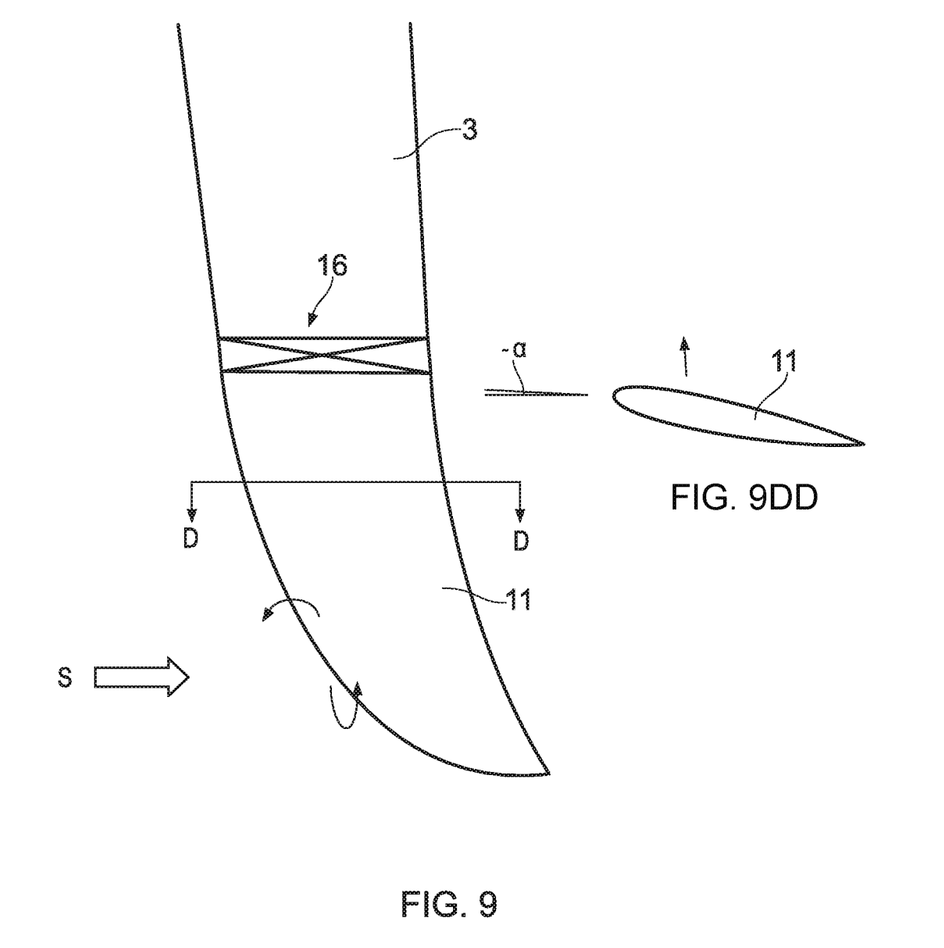
FIG. 9 shows a plan view of the wing tip portion in the third configuration of FIG. 5 together with FIG. 9DD which is a section view taken along line D-D in FIG. 9 and illustrating the incidence of the tip portion.

FIG. 9 illustrates the outboard end of the wing 3 in the third configuration in which the freestream flow S generates a temporary aerodynamic load sufficient to overcome the pre-set load level at which the hinge 16 enables the tip portion 11 to rotate upwardly from the second configuration to the third configuration. FIG. 9 shows this third configuration in which, as shown in FIG. 9 D-D, the incidence of the tip portion 11 is rotated downwardly as compared with the second configuration shown in FIG. 8 to a lower angle of attack, alpha. This lower angle of attack (incidence), alpha, may be neutral or may be slightly negative. By reducing the incidence the upward lift force generated by the tip portion 11 is reduced in the third configuration as compared with the second configuration which helps to alleviate the gust load imparted to the main fixed portion of the wing 3 and causes the load acting on the tip portion 11 to reduce towards the predetermined load level at which the tip portion 11 can return to the second configuration shown in FIG. 8. The upward motion of the tip portion 11 due to the temporary aerodynamic load, e.g. a gust, together with the offset hinge 16 cause a negative incidence effect so as to reduce the lift on the tip portion 11, shifting the lift inboard on the wing 3, hence giving the loads alleviation.

The third configuration may be adopted when the loads on the tip portion exceed a predetermined level, for instance due to gust loads or an extreme manoeuvre. Exceeding the spring load of the hinge 16 in the vertical axis will cause the tip portion 11 to move above the optimum span length, reducing the bending moment on the whole wing 3, and also due to the vertical movement the component reducing the effective alpha and therefore reduce the lift and bending moment in a second mode. Further, continued rotation of the hinge 16 (having an offset hinge axis) or other unbalanced flexural element will also cause a further torsional nose down moment reducing the alpha of the tip portion 11, and hence the lift L, further. All three mechanisms reduce the lift on the tip portion and the moment arm mitigating some of the loads.

The sprung hinge 16 or other flexible element can be tailored such that the incidence, alpha, of the tip portion 11 varies as the tip portion is deflected in a vertical sense according to the speed of the aircraft 1 and aerodynamic forces on the tip portion 11.

The passively actuated wing tip portion can provide higher performance for an equivalent category of aircraft, without the complexity of an additional system to actuate a wing tip fold, through enhanced aerodynamics of an increased span an inherent load alleviation worked into the passive actuation of the system.

Figure 10:
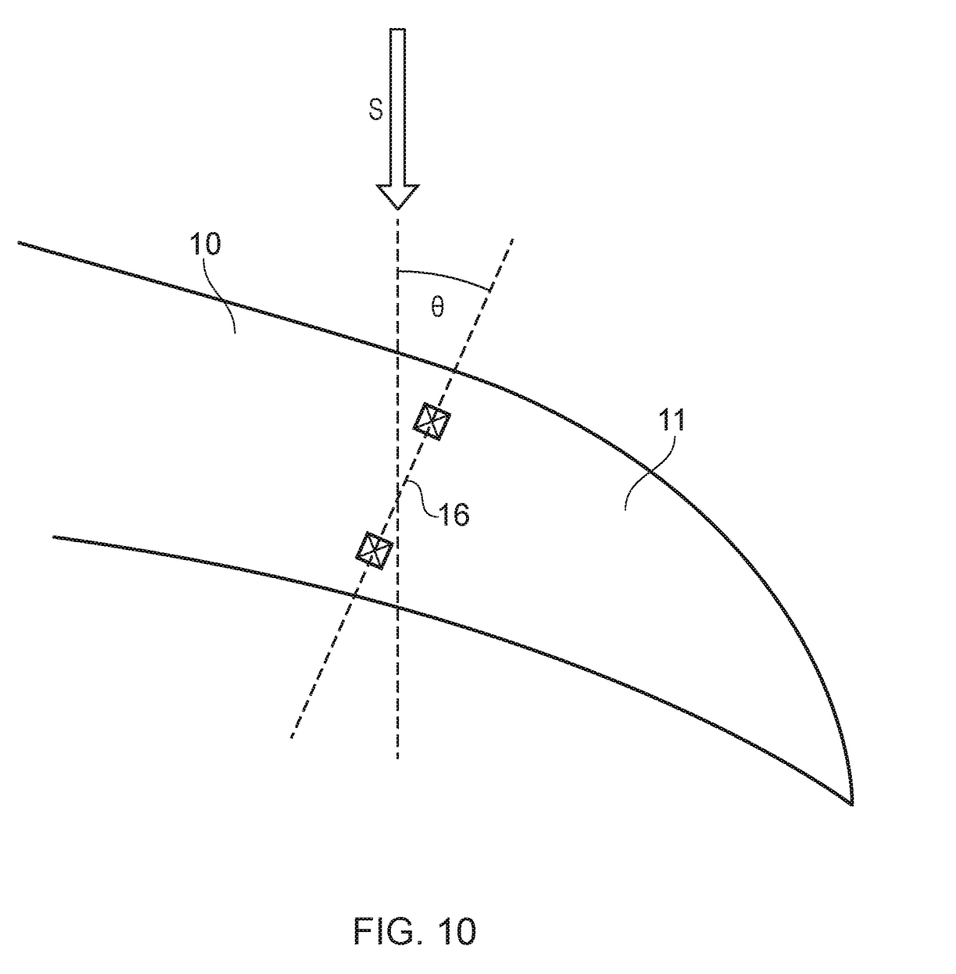
FIG. 10 shows a schematic plan view of the wing tip portion with the hinge axis offset to the line of flight.

FIG. 10 illustrates schematically the offset hinge 16. As can be seen the axis of rotation of the hinge 16 is offset by an angle theta to the freestream flow S (opposite the aircraft flight direction) when in plan view. The offset hinge 16 cause the positive-to-negative change in incidence of the tip portion 11 as the tip portion 11 rotates upwardly about the hinge.

Figure 11A:
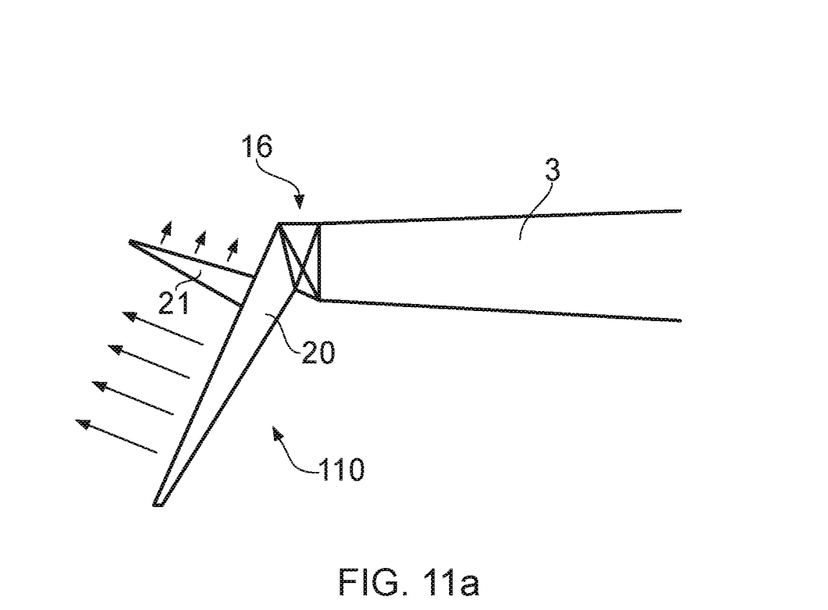
Figure 11B:
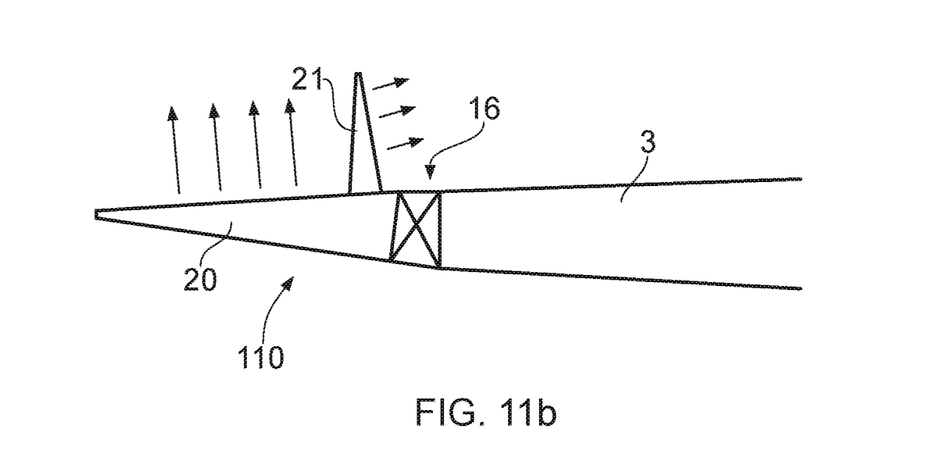

FIG. 11 illustrates a further example in which the tip portion 110 comprises a first lifting surface 20 substantially identical to the tip portion 11 described previously and with the addition of a second lifting surface 21. Like reference numerals are used to denote like parts with the previous examples. Whereas the first lifting surface 20 is a downlet in the first configuration shown in FIG. 11a, the second lifting surface 21 projects from near the hinge 16 outwardly such that the extent of the second lifting surface in the wing spanwise direction is substantially the same as the extent of the first lifting surface 20. The second lifting surface 21 is fixed so as to rotate with the first lifting surface 20. The second lifting surface 21 not only aids the rotation of the tip portion 110 from the first configuration shown in FIG. 11a to the second configuration shown in FIG. 11b, but also enables wing loads redistribution when in the second configuration. Like the previous examples, the tip portion 110 may also be configured to rotate further to a third configuration to provide loads alleviation.

Figure 12A:
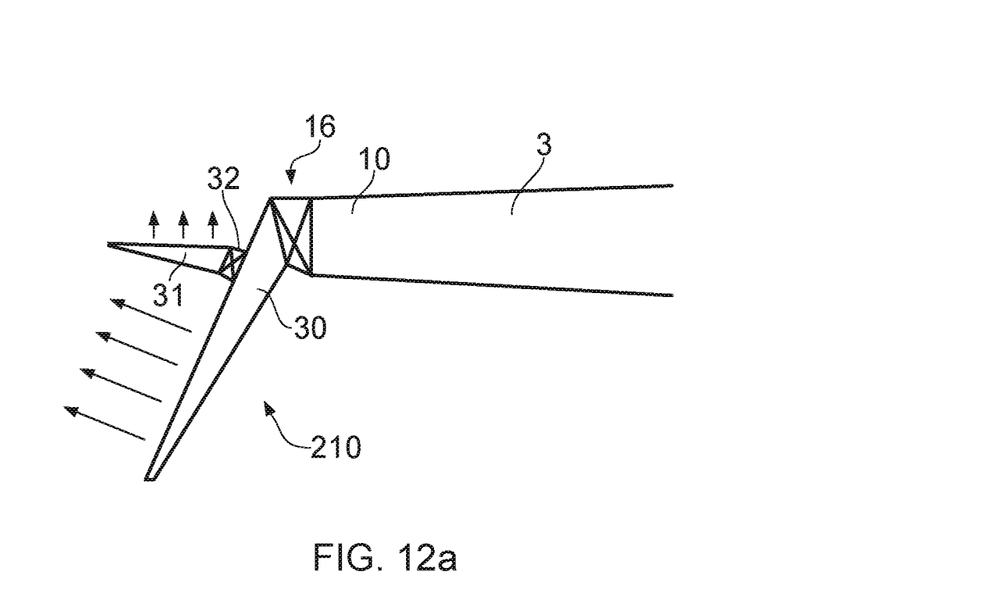
Figure 12B:
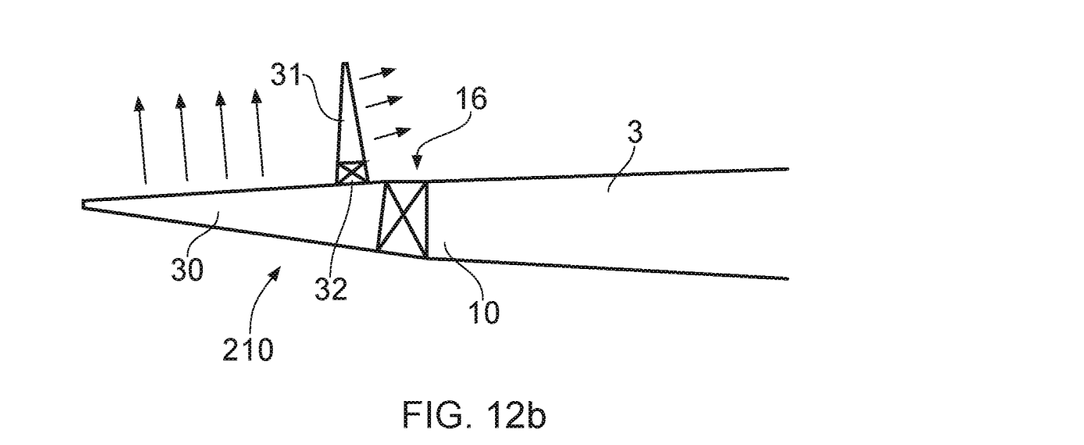

FIG. 12 shows a yet further example of the tip portion 210 which shares many common features with the example shown in FIG. 11 and in which like reference numerals are used to denote like parts. The example shown in FIG. 12 differs only in that the second lifting surface 31 is connected to the first lifting surface 30 by a sprung hinge 32 or other flexural element constructed similarly to the sprung hinge 16 which couples the first lifting surface 30 to the main fixed portion of the wing 3. FIG. 12a shows the tip portion 210 in the first configuration and FIG. 12b shows the tip portion 210 in the second configuration. As can be seen, the second lifting surface 31 is configured to rotate in the inboard direction towards the aircraft fuselage 2 from the first configuration towards the second configuration. Like the previous examples, the tip portion 110 may also be configured to rotate further to a third configuration to provide loads alleviation.

In a further embodiment, not illustrated, the second lifting surface 31 is coupled by the sprung hinge 32 to the tip end 10 of the main fixed portion of the wing 3 and not to the first lifting surface 30.

Figure 13A:
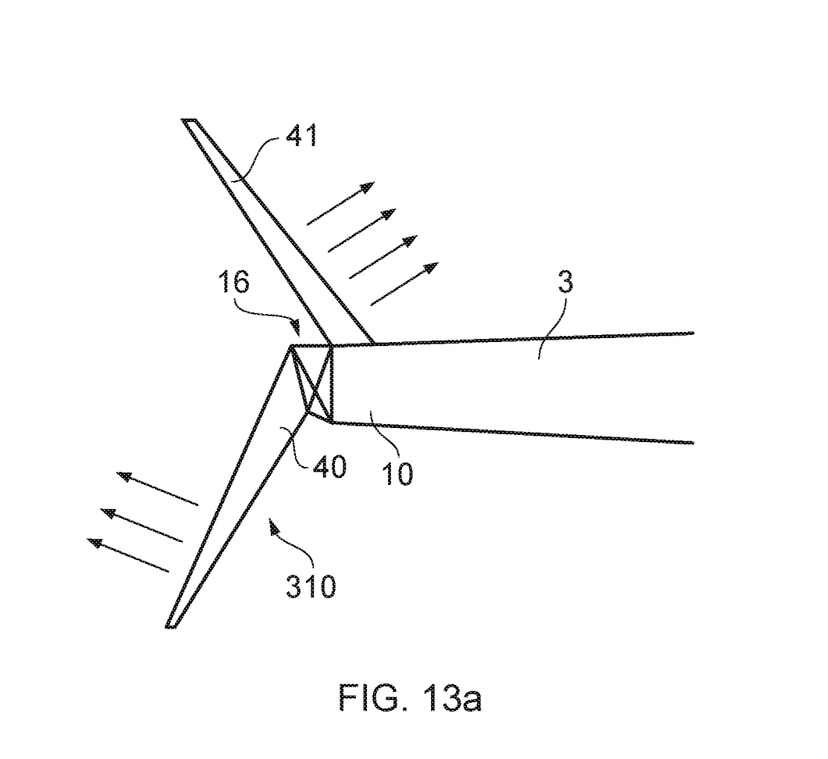
Figure 13B:
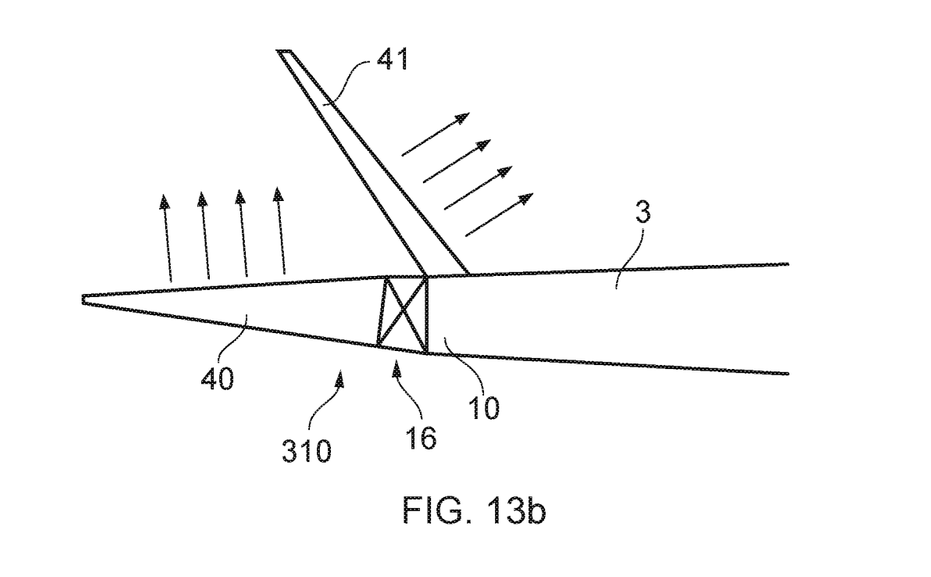

FIG. 13 illustrates a further example in which the tip portion 310 comprises a first lifting surface 40 substantially identical to the tip portion 11 described previously and with the addition of a second lifting surface 41. Like reference numerals are used to denote like parts with the previous examples. Whereas the first lifting surface 40 is a downlet in the first configuration shown in FIG. 13a, the second lifting surface 41 projects from near the hinge 16 outwardly such that the extent of the second lifting surface in the wing spanwise direction is substantially the same as the extent of the first lifting surface 40. The second lifting surface 41 is fixed to the outboard end 10 of main fixed portion of the wing 3. The second lifting surface 41 is fixed such it substantially does not rotate with respect to the main fixed portion of the wing 3. The second lifting surface 41 is therefore attached on the opposite side of the hinge 16 to the first lifting surface 40. The first lifting surface 40 is configured to rotate from the first configuration shown in FIG. 13a to the second configuration shown in FIG. 13b in the same way as described previously for the tip portion 11. Like the previous examples, the first lifting surface 40 may also be configured to rotate further to a third configuration to provide loads alleviation.

It is to be noted that in the above described embodiments the operation of the sprung hinge 16 and the operation of the sprung hinge 32 are mechanically independent and rotation about the hinges 16, 32 is entirely passive and governed by the aerodynamic loads acting on the lifting surfaces.

Figure 14:
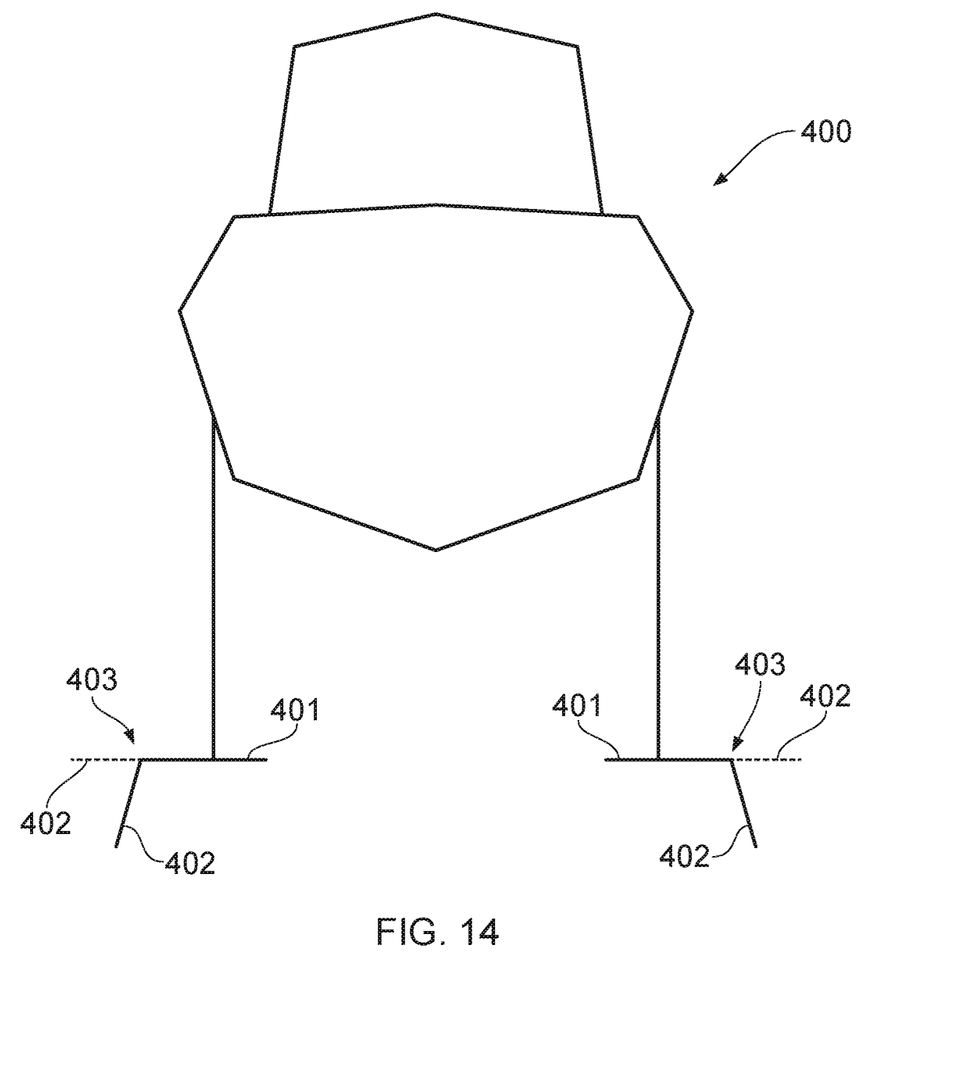
FIG. 14 shows a schematic view looking aft of a boat having hydrofoils including movable tip portions.

Although in the above described embodiments the fluid foil is being described in the context of an aircraft wing, it will be appreciated that the fluid foil may alternatively be any other aerofoil, and may alternatively be a hydrofoil for racing yachts or boats. FIG. 14 illustrates schematically a boat 400 with a hydrofoil having a main fixed portion 401 and a tip portion 402 movably mounted at a tip end of the main fixed portion 401 by a sprung hinge 403 or other flexural element. In FIG. 14 the tip portion 402 is shown in a first configuration in solid line and in a second configuration in broken line. Operation of the hydrofoil for the boat 400 is substantially identical to that described above with reference to FIGS. 2-5.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft including a wing, the wing comprising:
a main fixed portion and a tip portion movably mounted at a tip end of the main fixed portion via a flexible element or hinge,
wherein the main fixed portion has an upper surface and a lower surface, and the tip portion has an upper surface and a lower surface, and the aircraft is operable in:
   a) a first configuration in which the upper surface of the tip portion is entirely angled downwardly with respect to the upper surface of the main fixed portion; and
   b) a second configuration in which the tip portion is rotated upwardly with respect to the first configuration such that the upper surface of the tip portion and the upper surface of the main fixed portion are aligned in a spanwise direction across a junction between the tip portion and the main fixed portion,
wherein the movement of the tip portion with respect to the main fixed portion from the first configuration to the second configuration is exclusively passively actuated by movement of the aircraft with respect to a surrounding air flow, and
wherein the tip portion is biased by the flexible element or hinge towards the first configuration during relative forward movement of the aircraft through the surrounding air flow which is below a predetermined forward air speed.

2. The aircraft according to claim 1, wherein the aircraft is operable in:
   c) a third configuration in which the upper surface of the tip portion is angled upwardly with respect to the upper surface of the main fixed portion.

3. The aircraft according to claim 1, wherein the wing has a span, and the span increases between the first configuration and the second configuration.

4. The aircraft according to claim 1, wherein the flexible element or hinge includes a variable spring.

5. The aircraft according to claim 1, wherein the first configuration corresponds to a downward-most position of the tip portion.

6. The aircraft according to claim 1, wherein the tip portion includes a first lifting surface having the upper surface and the lower surface of the tip portion, and the tip portion further comprises one or more secondary lifting surfaces.

7. A fluid foil comprising
a main fixed portion and a tip portion movably mounted at a tip end of the main fixed portion,
wherein the main fixed portion has an upper surface and a lower surface, and the tip portion has an upper surface and a lower surface, and the fluid foil is operable in:
   a) a first configuration in which the upper surface of the tip portion is angled downwardly with respect to the upper surface of the main fixed portion; and
   b) a second configuration in which the tip portion is rotated upwardly with respect to the first configuration such that the upper surface of the tip portion and the upper surface of the main fixed portion are aligned in a spanwise direction across a joint between the tip portion and the main fixed portion,
wherein the movement of the tip portion with respect to the main fixed portion is exclusively passively actuated by movement of the foil with respect to a surrounding fluid, and
wherein the tip portion is configured to rotate about a pitch axis as the tip portion is rotated upwardly with respect to the first configuration.

8. A method of operating an aircraft having a main fixed portion and a tip portion movably mounted at a tip end of the main fixed portion via a flexible element or hinge, wherein the main fixed portion has an upper surface and a lower surface, and the tip portion has an upper surface and a lower surface, and method includes:
   moving the tip portion into a first configuration in which the upper surface of the tip portion is entirely angled downwardly with respect to the upper surface of the main fixed portion;
   moving the tip portion into a second configuration in which the tip portion is rotated upwardly with respect to the first configuration such that the upper surface of the tip portion and the upper surface of the main fixed portion are aligned in a spanwise direction across a junction between the wing tip portion and the main fixed portion,
wherein the movement of the tip portion with respect to the main fixed portion from the first configuration to the second configuration is exclusively passively actuated by movement of the aircraft with respect to a surrounding air, and
the flexible element or the hinge biasing the tip portion to remain in a downward-most position during relative forward movement of the aircraft through the surrounding air which is below a predetermined forward speed.

9. The method according to claim 8, further comprising placing the aircraft in:
   c) a third configuration in which the upper surface of the tip portion is angled upwardly with respect to the upper surface of the main fixed portion.

10. The method according to claim 8, further comprising biasing the tip portion towards the first configuration.

11. The method according to claim 10, further comprising varying a spring force applied by the flexible element or the hinge to the tip portion as the tip portion rotates upwardly with respect to the first configuration.

12. The method according to claim 8, further comprising rotating the tip portion about a pitch axis as the tip portion is rotated upwardly with respect to the first configuration.

13. The method according to claim 12, further comprising reducing an angle of incidence of the tip portion as the tip portion is rotated upwardly with respect to the first configuration.

* * * * *